(12) United States Patent
Ishii et al.

(10) Patent No.: US 7,980,339 B2
(45) Date of Patent: *Jul. 19, 2011

(54) POWER TRANSMISSION SYSTEM OF HYDRAULICALLY DRIVEN WORKING VEHICLE

(75) Inventors: Norihiro Ishii, Hyogo (JP); Koji Iwaki, Hyogo (JP); Fumitoshi Ishino, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/776,661

(22) Filed: May 10, 2010

(65) Prior Publication Data
US 2010/0222172 A1    Sep. 2, 2010

Related U.S. Application Data

(63) Continuation of application No. 11/433,551, filed on May 15, 2006, now Pat. No. 7,726,425.

(30) Foreign Application Priority Data

May 18, 2005    (JP) .................................. 2005-145694

(51) Int. Cl.
B60K 17/28    (2006.01)
(52) U.S. Cl. ..................................................... 180/53.4

(58) Field of Classification Search ................. 180/53.1, 180/53.4–53.6, 53.61, 242, 233, 305, 307
See application file for complete search history.

(56) References Cited

U.S. PATENT DOCUMENTS

| | | | |
|---|---|---|---|
| 6,732,828 | B1 | 5/2004 | Abend |
| 7,383,913 | B1 | 6/2008 | Tsukamoto et al. |
| 2006/0260303 | A1 | 11/2006 | Ishii et al. |
| 2008/0210482 | A1 | 9/2008 | Ishii et al. |
| 2009/0025997 | A1 | 1/2009 | Ishii et al. |

*Primary Examiner* — Faye M. Fleming
(74) *Attorney, Agent, or Firm* — Sterne, Kessler, Goldstein & Fox P.L.L.C.

(57) ABSTRACT

A power transmission system of a hydraulically driven working vehicle comprises: a prime mover supported by a vehicle frame, the prime mover including a prime mover output shaft projecting in the fore-and-aft direction of the vehicle; a pump housing; a hydraulic pump disposed in the pump housing, the hydraulic pump including a pump shaft projecting from the pump housing in the fore-and-aft direction of the vehicle so as to be drivingly connected to the prime mover output shaft; a first hydraulic motor disposed outside the pump housing so as to be fluidly connected to the hydraulic pump; a transaxle supported by one of front and rear portions of the vehicle frame, the transaxle including a transaxle housing, a pair of axles disposed in the transaxle housing so as to be driven by the hydraulic motor, and a differential gear unit disposed in the transaxle housing so as to be drivingly interposed between the hydraulic motor and the pair of axles; a PTO shaft; and a working power train extracting a part of power transmitted from the prime mover output shaft to the pump shaft and transmitting the extracted power to the PTO shaft.

19 Claims, 12 Drawing Sheets

POWER TRANSMISSION SYSTEM OF HYDRAULICALLY DRIVEN WORKING VEHICLE

CROSS REFERENCE TO RELATED APPLICATIONS

This application is a continuation of U.S. patent application Ser. No. 11/433,551 filed May 15, 2006, which is hereby incorporated in its entirety by reference.

BACKGROUND OF THE INVENTION

1. Field of the Invention

The invention relates to a power transmission system for a hydraulically driven working vehicle, especially, for a large-size vehicle.

2. Related Art

Conventionally, there is a well-known hydraulically driven working vehicle, equipped with a hydraulic pump disposed in a housing and drivingly connected to a prime mover (engine), and with a hydraulic motor disposed outside the housing and fluidly connected to the hydraulic pump so as to drive an axle. U.S. Pat. No. 6,732,828 discloses an example of this type of vehicle, wherein a hydraulic pump is disposed in a pump housing, a hydraulic motor for driving an axle is disposed in a transaxle housing separated from the pump housing, and a belt transmission system is interposed between a vertical output shaft of an upright engine and a working device.

The upright arrangement of the prime mover (engine) with the vertical output shaft is available because the vehicle is small-sized, particularly, in the fore-and-aft direction. If a working vehicle having such an arrangement of hydraulic pump and motor is large-sized, horizontal arrangement of a prime mover (engine) with a horizontal shaft is advantageous for ensuring a large space for other equipment including a working device (such as a midship mower) in the vertical direction. However, the thing to be considered is layout of a power transmission system for drivingly connecting the prime mover to the hydraulic pump and the working device without hindering arrangement, attachment and detachment of the working device.

SUMMARY OF THE INVENTION

An object of the invention is to provide an advantageous power transmission system for a working vehicle, among a prime mover, a hydraulic pump, a hydraulic motor for driving an axle and a working device, wherein the hydraulic pump is disposed in a housing and the hydraulic motor is disposed outside the housing so as to be fluidly connected to the hydraulic pump.

To achieve the object, a power transmission system of a hydraulically driven working vehicle according to the present invention comprises: a prime mover supported by a vehicle frame, the prime mover including a prime mover output shaft projecting in the fore-and-aft direction of the vehicle; a pump housing; a hydraulic pump disposed in the pump housing; a first hydraulic motor disposed outside the pump housing so as to be fluidly connected to the hydraulic pump; a first transaxle supported by one of front and rear portions of the vehicle frame; a first power take off shaft (a first PTO shaft); and a working power train. The hydraulic pump includes a pump shaft projecting from the pump housing in the fore-and-aft direction of the vehicle so as to be drivingly connected to the prime mover output shaft. The first transaxle includes a first transaxle housing, a pair of first axles disposed in the first transaxle housing so as to be driven by the first hydraulic motor, and a first differential gear unit disposed in the first transaxle housing so as to be drivingly interposed between the first hydraulic motor and the pair of first axles. The working power train extracts a part of power transmitted from the prime mover output shaft to the pump shaft and transmits the extracted power to the first PTO shaft.

The power transmission system is available for various arrangements about the driving connection between the prime mover and the hydraulic pump, the working power train, the first transaxle, etc., without hindering arrangement, attachment and detachment of a working device driven by the first PTO shaft.

With respect to arrangement about the driving connection between the prime mover and the hydraulic pump, preferably, a propeller shaft is drivingly interposed between the prime mover output shaft and the pump shaft, thereby ensuring a flexible driving connection between the prime mover and the hydraulic pump with little power loss.

Alternatively, a belt transmission is drivingly interposed between the prime mover output shaft and the pump shaft, thereby ensuring a simple and flexible driving connection between the prime mover and the hydraulic pump.

Alternatively, the pump shaft is directly connected to the prime mover output shaft, thereby ensuring a minimized driving connection between the prime mover and the hydraulic pump with little power loss.

With respect to arrangement of the working power train, preferably, the working power train includes a gear train, thereby reducing power loss.

Alternatively, the working power train includes a belt transmission, thereby being simple and flexible.

Preferably, the power transmission system further comprises a second power take off shaft (a second PTO shaft) to which the working power train also transmits the extracted power, thereby being available for driving a device in addition to a working device drivingly connected to the first PTO shaft.

Preferably, the power transmission system further comprises a cooling fan disposed on the pump shaft or on a shaft directly connected to the pump shaft, thereby efficiently cooling the pump housing incorporating the hydraulic pump in a small space and with components saved in number.

Preferably, the first hydraulic motor is disposed in the first transaxle housing, thereby minimizing the power transmission system.

Preferably, the first differential gear unit is a bi-directive clutch type differential gear unit. Therefore, differential drive of the first axles is automatically canceled when either of the drive wheels provided on the respective first axles slips, thereby ensuring traction ability and safety of the vehicle in a bad ground condition.

Alternatively, the first differential gear unit includes at least one of a limited slip differential element and a differential lock element. Therefore, differential drive of the first axles is automatically or manually canceled when either of the drive wheels provided on the respective first axles slips, thereby ensuring traction ability and safety of the vehicle in a bad ground condition.

Preferably, the power transmission system further comprises: a second transaxle supported by the other rear or front portion of the vehicle frame. The second transaxle includes a second transaxle housing, a pair of second axles disposed in the second transaxle housing, and a pair of second hydraulic motors disposed in the second transaxle housing so as to be fluidly connected to the hydraulic pump and to drive the respective second axles. Therefore, the vehicle can travel by four-wheel drive so as to increase traction ability.

Alternatively, the power transmission system further comprises: a second transaxle supported by the other rear or front portion of the vehicle frame. The second transaxle includes a second transaxle housing, a pair of second axles disposed in the second transaxle housing, a second hydraulic motor disposed in the second transaxle housing so as to be fluidly connected to the hydraulic pump, and a second differential gear unit disposed in the second transaxle housing so as to be drivingly interposed between the second hydraulic motor and the pair of second axles. Therefore, the vehicle can travel by four-wheel drive so as to increase traction ability.

Preferably, the second differential gear unit is a bi-directive clutch type differential gear unit. Therefore, differential drive of the second axles is automatically canceled when either of the drive wheels provided on the respective second axles slips, thereby ensuring traction ability and safety of the vehicle in a bad ground condition.

Alternatively, the second differential gear unit includes at least one of a limited slip differential element and a differential lock element. Therefore, differential drive of the second axles is automatically or manually canceled when either of drive wheels provided on the respective second axles slips, thereby ensuring traction ability and safety of the vehicle in a bad ground condition.

These, further and other objects, features and advantages will appear more fully from the following description with reference to the accompanying drawings.

DETAILED DESCRIPTION OF THE INVENTION

Figure 1:
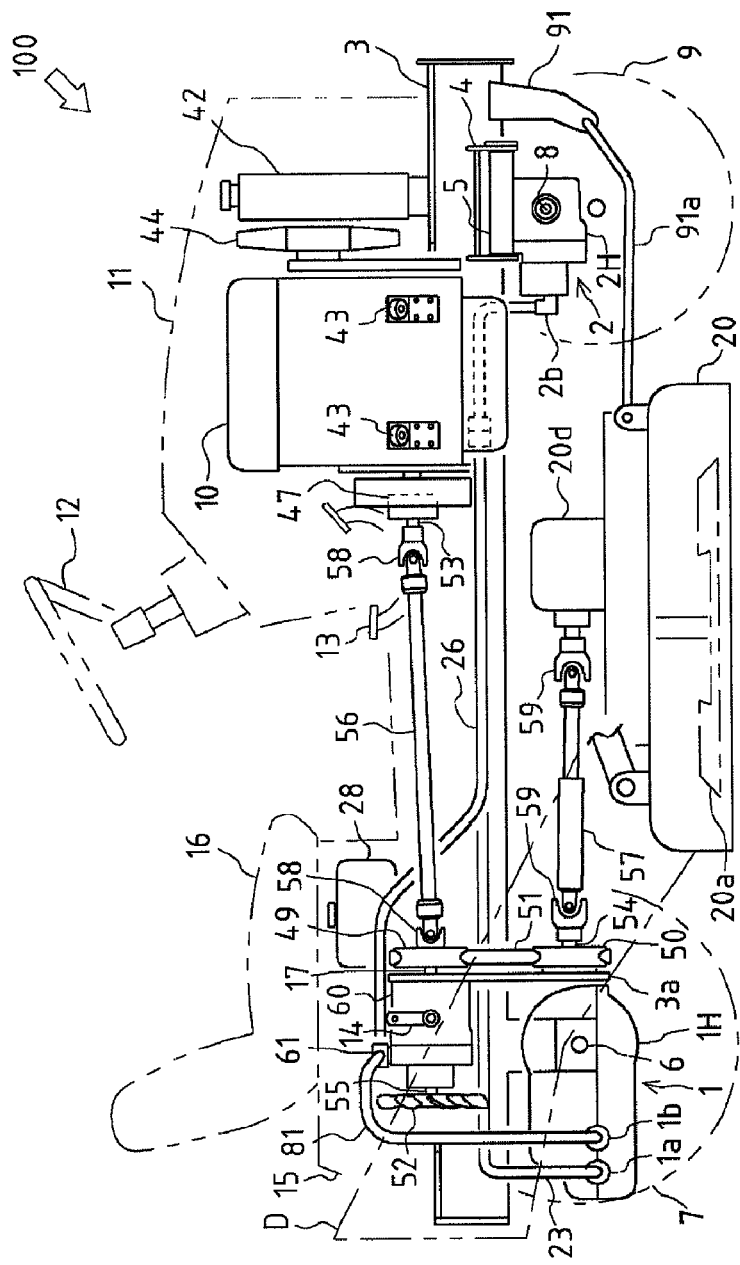
FIG. 1 is a sectional side view of an entire hydraulic four-wheel drive working vehicle equipped with a power transmission system according to a first embodiment of the present invention.
Figure 2:
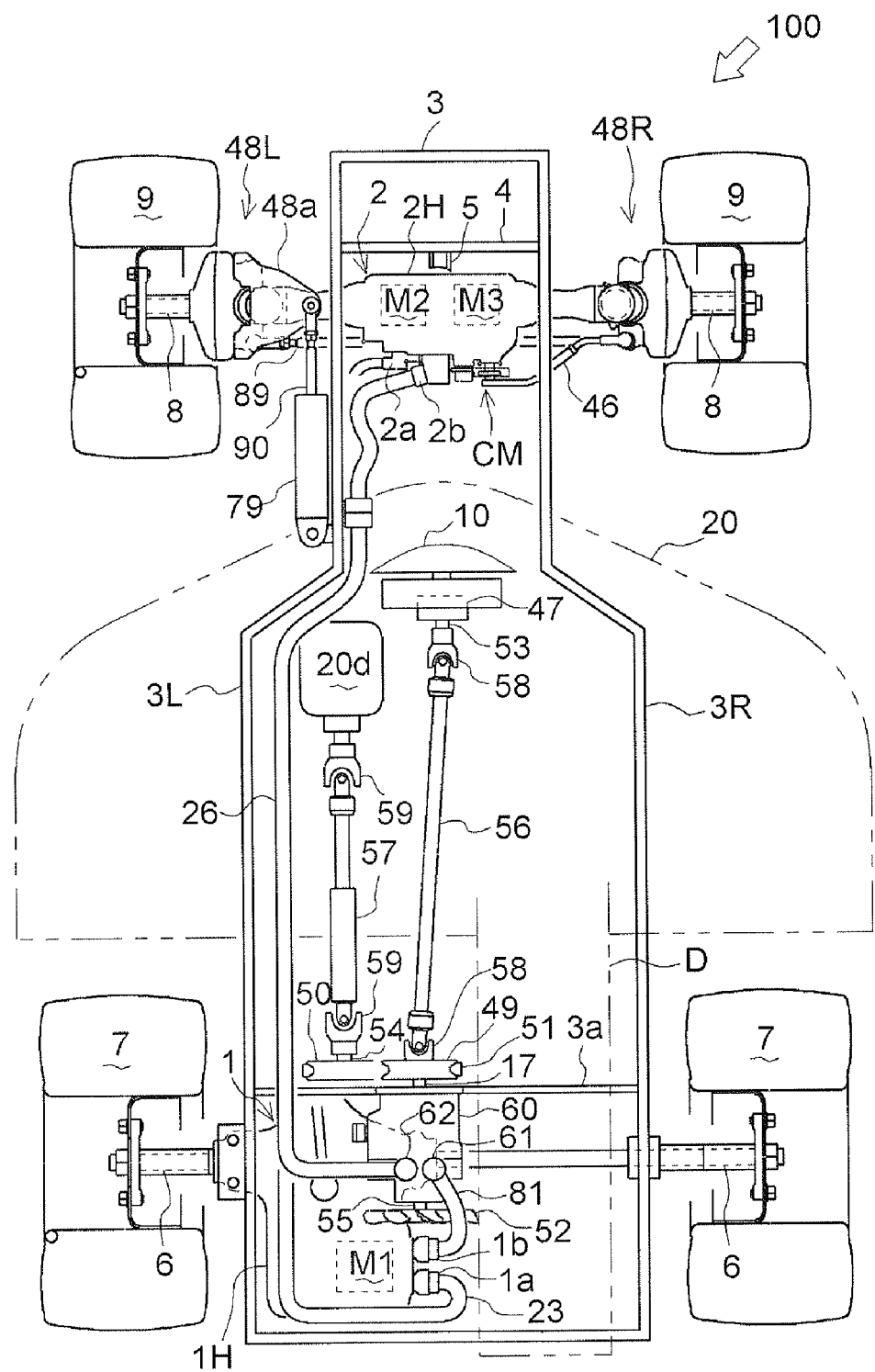
FIG. 2 is a sectional plan view of the entire hydraulic four-wheel drive working vehicle according to the first embodiment.

Referring to FIGS. 1 and 2, a hydraulic four-wheel drive working vehicle 100 according to a first embodiment of the invention will be described. Vehicle 100 is an Ackerman type steered lawn tractor, comprising: a frame 3; a rear transaxle 1 supported by a rear portion of frame 3; a front transaxle 2 supported by a front portion of frame 3; an engine 10 supported by frame 3 between front and rear transaxles 1 and 2; a pump housing 60 supported by frame 3; and a mower 20 (an example of a working device driven by engine 10) vertically movably suspended below frame 3. Frame 3 includes a pair of left and right vertical side plate portions 3L and 3R (as shown in FIG. 2) extended substantially in the fore-and-aft direction. Rear transaxle 1 and pump housing 60 are disposed in the inside space of frame 3 between the left and right side plate portions 3L and 3R.

In vehicle 100, pump housing 60 incorporating a variable displacement hydraulic pump P (see FIG. 3) is supported by the rear portion of frame 3 just above rear transaxle 1. In each of later-discussed vehicles 200, 300 and 400, pump housing 60 is disposed at a position different from that of vehicle 100.

Rear transaxle 1 includes a rear transaxle housing 1H incorporating a (fixed displacement) hydraulic motor M1 driven by hydraulic pump P, left and right rear axles 6, a differential gear unit 38 (see FIG. 3) differentially connecting axles 6 to each other, and a deceleration gear train 37 (see FIG. 3) drivingly interposed between hydraulic motor M1 and differential gear unit 38. Alternatively, hydraulic motor M1 may be disposed outside rear transaxle housing 1H and pump housing 60, if hydraulic motor M1 can be fluidly connected to hydraulic pump P. Left and right rear axles 6 project laterally outward from rear transaxle housing 1H so as to be fixedly provided on tips thereof with respective rear wheels 7 serving as unsteerable drive wheels.

Front transaxle 2 includes a front transaxle housing 2H pivoted at a lateral middle top portion thereof onto frame 3 through a center pivot 5 so as to be vertically movable at left and right ends thereof. Front transaxle housing 2H incorporates a pair of left and right hydraulic motors M2 and M3. Left and right front wheel support units 48L and 48R are steerably provided on left and right ends of front transaxle housing 2H, respectively. Axles 8 are supported by respective front wheel support units 48L and 48R, and left and right front wheels 9 are fixed on respective axles 8 so as to serve as steerable drive wheels.

Engine 10 is supported by frame 3 through vibro-isolating rubbers 43 and disposed in a bonnet 11. A radiator fan 44 and a radiator 42 are mounted on frame 3 just in front of engine 10 in bonnet 11.

A dashboard is formed just behind bonnet 11. A steering wheel 12 is extended upwardly rearward from the dashboard, and operatively connected to a steering control valve disposed in a valve casing 12a (see FIG. 3). The steering control valve is fluidly connected to a power steering cylinder 79 operatively connected to front wheel support units 48L and 48R, so that front wheel support units 48L and 48R, i.e., front wheels 9 are steered by rotating steering wheel 12.

A speed control pedal 13 and a brake pedal (not shown) are disposed at a foot portion of the dashboard. Speed control pedal 13 is a seesaw pedal having oppositely movable front and rear portions with a pivot therebetween. The front portion of pedal 13 is to be depressed for setting forward traveling speed, and the rear portion of pedal 13 is to be depressed for setting backward traveling speed. A speed control lever 14 is pivoted on pump housing 60 so as to interlock with a movable swash plate Pa of hydraulic pump P in pump housing 60, and is operatively connected to speed control pedal 13, so that the rotational direction and speed of rear wheels 7 (and front wheels 9) is controlled by the depression direction and degree of speed control pedal 13.

A rear cover 15 is mounted on a rear portion of frame 3, and a driver's seat 16 is mounted on the top of rear cover 15. A reservoir tank 28 is disposed in rear cover 15 just below seat 16. Reservoir tank 28 is provided at the top thereof with an oiling port which also serves as a breather.

Mower 20 is disposed under frame 3 between rear wheels 7 and front wheels 9. Left and right mower hungers 91 are extended from front end portions of the left and right side plate portions 3L and 3R of frame 3, respectively, and connected to the front end of mower 20 through respective link rods 91a, thereby vertically movably suspending mower 20.

Mower 20 incorporates rotary blades 20a, and is provided at the top thereof with a gearbox 20d for driving rotary blades 20a. A mower input shaft projects rearward from gearbox 20d so as to be drivingly connected to a later-discussed mid PTO shaft 54.

A grass collection device (not shown) can be optionally connected to a rear end portion of vehicle 100 and a duct D can be optionally interposed between mower 20 and the grass collection device, so as to collect grass mowed by rotary blades 20a in mower 20. Duct D is extended upwardly rearward from a right portion of mower 20 and connected at the rear end thereof to the grass collection device. A duct fan (not shown) is disposed in duct D so as to absorb the grass mowed by rotary blades 20a and to blow the grass to the grass collection device through duct D. The duct fan is drivingly connected to a later-discussed rear PTO shaft 55.

When duct D is attached to vehicle 100, duct D is disposed in the inside of frame 3 along the right side plate portion 3R of frame 3. To ensure this rightward eccentric arrangement of duct D, as shown in FIG. 2, rear transaxle 1, pump housing 60, reservoir tank 28, a power transmission system for transmitting power from engine 10 to hydraulic pump P and mower 20, hydraulic pressure fluid pipes extended from pump housing 60 and rear transaxle 1, and top gearbox 20d of mower 20 are disposed in the inside of frame 3 leftward from (laterally opposite to) duct D.

The power transmission arrangement between engine 10 and hydraulic pump P and mower 20 will be described with reference to FIGS. 1 to 3. As shown in FIGS. 1 and 2, engine 10 includes a horizontal output shaft 53 projecting rearward from a flex coupling damper 47 at the rear end of engine 10. Output shaft 53 is disposed at the lateral center of frame 3 between the left and right side plate portions 3L and 3R of frame 3.

As shown in FIGS. 1 and 2, vertical and lateral plate-shaped cross member 3a is spanned between the left and right side plate portions 3L and 3R of frame 3. Pump housing 60 is fixed onto a rear surface of cross member 3a so as to be cantilevered rearward from cross member 3a. Hydraulic pump P includes a horizontal pump shaft 17 projecting forward from pump housing 60 through cross member 3a. A pair of fluid suction-and-delivery ports 61 and 62 are disposed on a top surface of pump housing 60.

A propeller shaft 56 is interposed between output shaft 53 of engine 10 and pump shaft 17. Propeller shaft 56 is connected at a front end thereof to the rear end of output shaft 53 through a universal joint 58, and at a rear end thereof to the front end of pump shat 17 through another universal joint 58.

Referring to FIG. 2, when viewed in plan, pump shaft 17 is slightly offset leftward from output shaft 53 so as to be prevented from interfering with duct D, so that propeller shaft 56 is slightly inclined rearwardly leftward. Further, referring to FIG. 1, when viewed in side, pump shaft 17 is disposed slightly lower than output shaft 53, so that propeller shaft 56 is slightly inclined rearwardly downward.

As shown in FIGS. 1 and 2, rear transaxle housing 1H is disposed leftwardly downward from pump housing 60 and fixed to the left side plate portion 3L of frame 3. A pair of fluid suction-and-delivery ports 1a and 1b are disposed on a right side surface of rear transaxle housing 1. A pipe 81 is interposed between port 61 on pump housing 60 and port 1b on rear transaxle housing 1H.

Differential gear unit 38 is provided with a limited slip differential (LSD) element 38a and a differential lock element 38b. Differential lock element 38b is manually operated so as to lock axles 6 to each other, i.e., cancel the differential rotation of axles 6, thereby transmitting torque to rear wheel 7 slipping in mud or a ditch. However, even when differential lock element 38b is not operated for differential lock, LSD element 38a transmits a considerable amount of power to the slipping wheel 7. LSD element 38a can be any type element, such as an element including a pair of helical planetary gears, or a viscous coupling type element. Differential gear unit 38 may be provided with either LSD element 38a or differential lock element 38b. Alternatively, differential gear unit 38 may be a normal differential gear unit with neither LSD element 38a nor differential lock element 38b.

Figure 4:
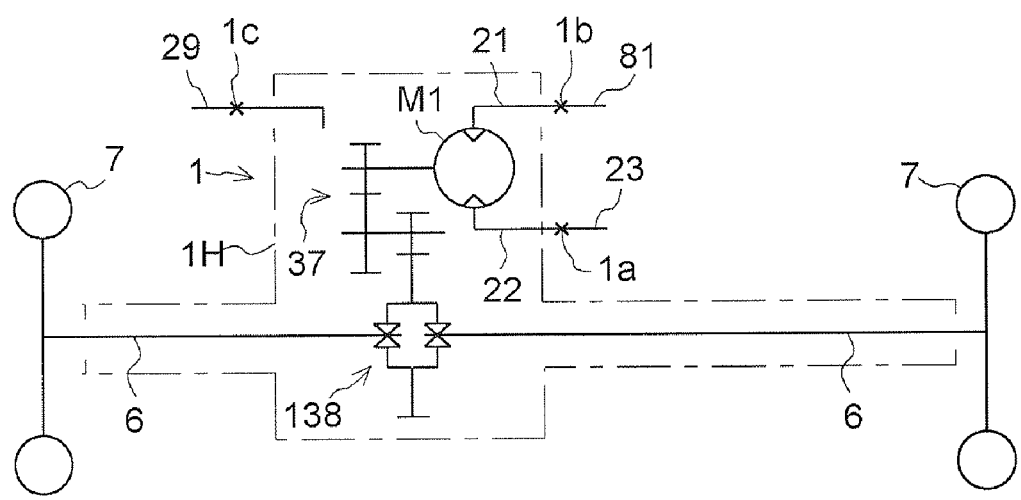
FIG. 4 is a hydraulic circuit diagram of an alternative rear transaxle to be adapted to the hydraulic circuit of FIG. 3.

Alternatively, the differential gear unit disposed in rear transaxle housing 1H may be a bi-directive clutch type differential gear unit 138, as shown in FIG. 4, which can automatically transmit power to rear wheel 7 slipping in mud or a ditch.

Referring to front transaxle 2, hydraulic motor M2 is fixed in displacement, and hydraulic motor M3 is variable in displacement. Alternatively, both the hydraulic motors for driving respective axles 8 may be variable in displacement.

Figure 3:
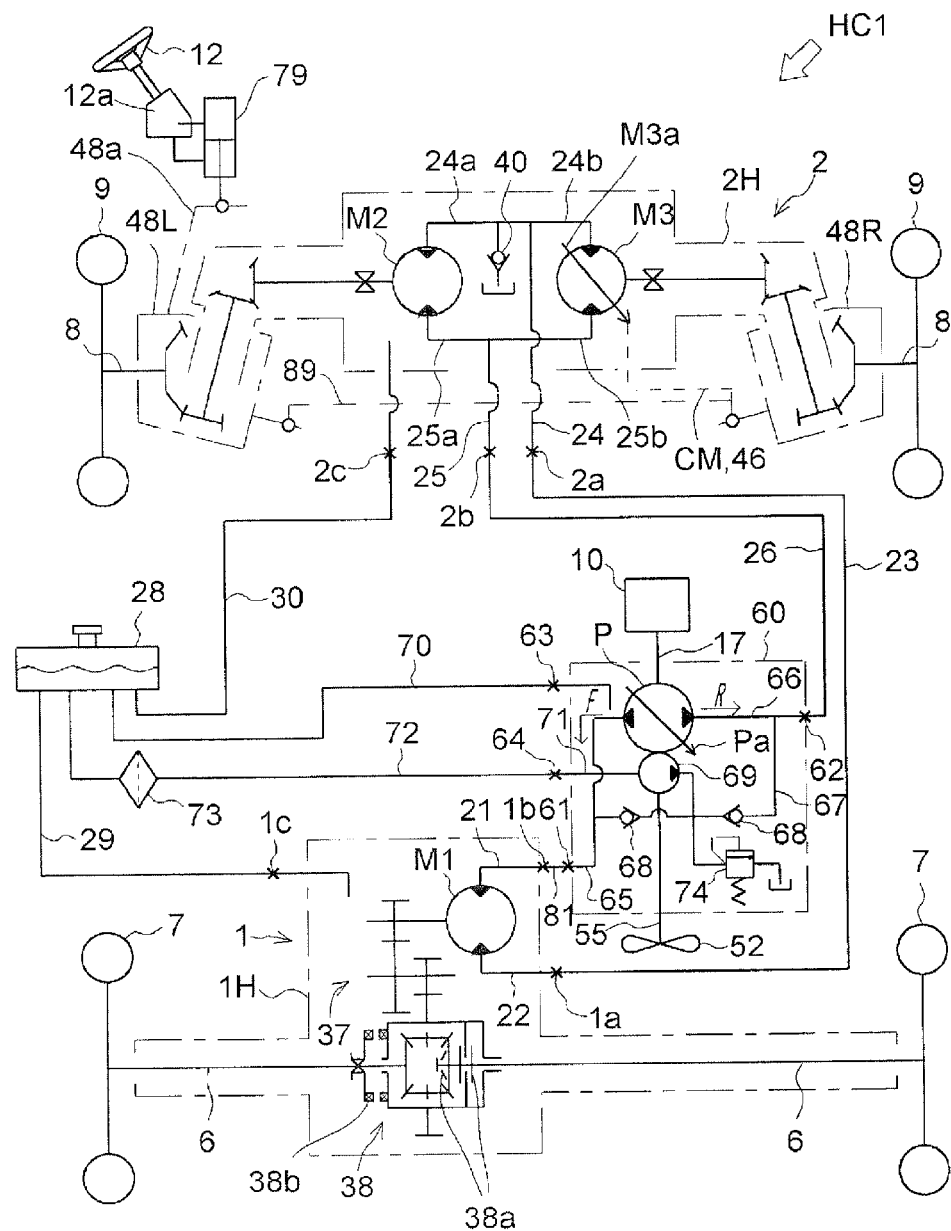
FIG. 3 is a hydraulic circuit diagram of the hydraulic four-wheel drive working vehicle.

Variable displacement hydraulic motor M3 is provided with a movable swash plate M3a (see FIG. 3). A cam mechanism CM interlocking with swash plate M3a is disposed along the rear surface of front transaxle housing 2H. In this embodiment, the right hydraulic motor for right axle 8 is variable displacement hydraulic motor M3. Therefore, cam mechanism CM is disposed rearwardly leftward of front transaxle housing 2H availably for connection to swash plate M3a.

Referring to FIG. 2, left and right front wheel support units 48L and 48R are connected to each other through a tie rod 89. Cam mechanism CM is connected to one of front wheel support units 48L and 48R (in this embodiment, right front wheel support unit 48R) through a link 46, so as to transmit left or right turning of front wheel support units 48L and 48R to movable swash plate M3a. Therefore, when steerable front wheels 9 are steered by rotating steering wheel 12, the tilt angle of movable swash plate M3a is reduced so as to accelerate axles 8 (front wheels 9), thereby ensuring smooth turning of vehicle 100 without dragging of wheels 9.

Referring to FIG. 2, power steering cylinder 79 is disposed along the outside surface of a front portion of the left side plate portion 3L of frame 3. A bracket 48a is fixed on left front wheel support unit 48L (opposite to right front wheel support unit 48R connected to cam mechanism CM), and a piston rod 90 of power steering cylinder 79 is pivoted at the front tip thereof onto bracket 48a. The telescopic movement of piston rod 90 of power steering cylinder 79 is controlled by the steering control valve in valve casing 12a based on the rotation direction and angle of steering wheel 12 so as to turn left front wheel support unit 48L, thereby also turning right front wheel support unit 48R through tie rod 89.

A pair of fluid suction-and-delivery ports 2a and 2b are disposed on the rear left surface of front transaxle housing 2H laterally opposite to cam mechanism CM. A pipe 23 is interposed between port 2a and port 1a on rear transaxle housing 1H, and a pipe 26 is interposed between port 2b and port 62 on pump housing 60. Pipes 23 and 26 are extended along the left side plate portion 3L of frame 3. In this way, pump housing 60, rear transaxle housing 1H and front transaxle housing 2H are mutually fluidly connected through pipes 81, 23 and 26.

A working power train for driving an attached working device such as mower 20 will be described. As shown in FIGS. 1 and 2, a pulley 49 is fixed on a portion of pump shaft 17 projecting forward from cross member 3a. A pulley 50 is supported onto the front surface of cross member 3a downwardly leftward from pulley 49. A belt 51 is interposed between pulleys 49 and 50. A tension clutch (not shown) is interposed between pulleys 49 and 50, so as to selectively tighten belt 51 to transmit torque of pulley 49 to pulley 50 or loosen belt 51 to isolate pulley 50 from torque of pulley 49. Pulley 50 has a forwardly projecting horizontal pulley shaft serving as mid PTO shaft 54. Gearbox 20d on mower 20 is disposed in front of mid PTO shaft 54, and a propeller shaft 57 is interposed between mid PTO shaft 54 and the input shaft projecting rearward from gearbox 20d through respective universal joints 59.

Pump shaft 17 is extended rearward so as to have a portion projecting rearward from pump housing 60, serving as a rear PTO shaft 55. A clutch box can be connected to rear PTO shaft 55, and the above-mentioned duct fan in duct D can be drivingly connected to rear PTO shaft 55.

In this way, a part of power transmitted from engine 10 to pump shaft 17 for driving hydraulic pump P is extracted to transmitted to mid PTO shaft 54 and rear PTO shaft 55, so as to drive working devices drivingly connected to respective PTO shafts 54 and 55.

In the embodiment shown in FIGS. 1 and 2, a cooling fan 52 is fixed on rear PTO shaft 55 (the rearwardly extended portion of pump shaft 17) so as to blow air forward onto pump housing 60. The cooling air from cooling fan 52 is reflected by cross member 3a so as to also cool rear transaxle housing 1H. In this way, the number of components for cooling pump housing 60 and rear transaxle housing 1H is saved by providing cooling fan 52 on the extended portion of pump shaft 17 serving as rear PTO shaft 55.

Referring to FIG. 3, an HST circuit HC1 of vehicle 100 will be described. As mentioned above, pipe 81 is interposed between port 61 of pump housing 60 and port 1b of rear transaxle housing 1H, pipe 23 is interposed between port 1a of rear transaxle housing 1H and port 2a of front transaxle housing 2H, and pipe 26 is interposed between port 2b of front transaxle housing 2H and port 62 of pump housing 60.

In pump housing 60, a passage 65 is interposed between hydraulic pump P and port 61, and a passage 66 is interposed between hydraulic pump P and port 62. It is defined that, during forward travel of vehicle 100, the delivery port of hydraulic pump P is connected to passage 65 and port 61, and the suction port of hydraulic pump P to passage 66 and port 62.

In rear transaxle housing 1H, a passage 22 is interposed between hydraulic motor M1 and port 1a, and a passage 21 is interposed between hydraulic motor M1 and port 1b.

In front transaxle housing 2H, a passage 24 is extended from port 2a and bifurcated into passages 24a and 24b connected to respective hydraulic motors M2 and M3, and a passage 25 is extended from port 2b and bifurcated into passages 25a and 25b connected to respective hydraulic motors M2 and M3.

In this way, HST circuit HC1 is configured so that hydraulic motor M1 for driving rear axles 6 and the pair of hydraulic motors M2 and M3 for driving front axles 8 are fluidly connected in series to hydraulic pump P, and hydraulic motors M2 and M3 are fluidly connected in parallel to hydraulic pump P so as to differentially drive front axles 8.

When vehicle 100 travels forward (speed control pedal 13 is depressed for forward traveling), fluid delivered from hydraulic pump P is supplied to hydraulic motor M1 through passage 65, port 61, pipe 81, port 1b and passage 21, subsequently supplied to hydraulic motors M2 and M3 through passage 22, port 1a, pipe 23, port 2a and passage 24 (passages 24a and 24b), and returned to hydraulic pump P through passage 25 (passages 25a and 25b), port 2b, pipe 26, port 62 and passage 66. In other words, during forward travel of vehicle 100, ports 61, 1a and 2b serve as delivery ports, and ports 62, 1b and 2a serve as suction ports. When vehicle 100 travels backward, the fluid supply route is reversed, so that ports 61, 1a and 2b serve as suction ports, and ports 62, 1b and 2a serve as delivery ports.

An unshown drive mode switching valve may be disposed across pipes 23 and 26. The valve is shiftable between a two-wheel drive position and a four-wheel drive position. When the valve is disposed at the four-wheel drive position, the valve thoroughly opens pipe 23 between ports 1a and 2a, and pipe 26 between ports 2b and 62, thereby supplying hydraulic motors M2 and M3 with fluid delivered from hydraulic pump P. When the valve is disposed at the two-wheel drive position, the valve bypasses between ports 1a and 62 so as to circulate fluid between hydraulic pump P and hydraulic motor M1 without supplying hydraulic motors M2 and M3 with fluid from hydraulic pump P. Simultaneously, the valve disposed at the two-wheel drive position bypasses between ports 2a and 2b so as to allow the free rotation of hydraulic motors M2 and M3 isolated from hydraulic pressure supplied by hydraulic pump P.

Pump housing 60, rear transaxle housing 1H and front transaxle housing 2H are filled therein with fluid so as to serve as respective fluid sumps. Pump housing 60 is provided with a drain port 63, rear transaxle housing 1H is provided with a drain port 1c, and front transaxle housing 2H is provided with a drain port 2c. Reservoir tank 28 is connected to drain port 63 through a pipe 70, to drain port 1c through a pipe 29, and to drain port 2c through a pipe 30, so as to absorb excessive fluid from any of pump housing 60, rear transaxle housing 1H and front transaxle housing 2H, when the corresponding fluid sump is excessively expanded.

Pump housing 60 incorporates a charge pump 69, which is driven together with hydraulic pump P by pump shaft 17. In this regard, pump shaft 17 penetrates hydraulic pump P and charge pump 69 so as to project forward to serve as the input shaft drivingly connected to engine 10, and to project rearward to serve as rear PTO shaft 55. A suction port 64 is opened on pump housing 60, and connected to reservoir tank 28 through a pipe 72 outside pump housing 60, and to charge pump 69 through a passage 71 in pump housing 60. A filter 73 is provided on an intermediate portion of pipe 72.

In pump housing 60, a charge fluid passage 67 is extended from charge pump 69 and connected to passages 65 and 66 through respective check valves 68, so as to supply fluid delivered from charge pump 69 to lower-pressurized one of passages 65 and 66. A pressure-regulating valve 74 is connected to passage 67 at the upstream side of check valves 68 so as to drain excessive fluid to the fluid sump in pump housing 60.

Incidentally, a hydraulic fluid source of the steering control valve in valve casing 12a is omitted in FIG. 3. Preferably, instead of charge fluid passage 67 connected to passages 65 and 66, the fluid delivered from charge pump 69 may be extracted from pump housing 60 to be supplied to the steering control valve, and subsequently, the fluid may be introduced into pump housing 60 so as to be supplied to either of passages 65 and 66.

In front transaxle housing 2H, a check valve 40 is connected to passage 24a so as to supply fluid from the fluid sump in front transaxle housing 2H to passage 24a at the upstream side of hydraulic motor M2 during forward travel of vehicle 100, thereby preventing cavitation caused by dragging of front wheels 9 by rear wheels 7.

Figure 5:
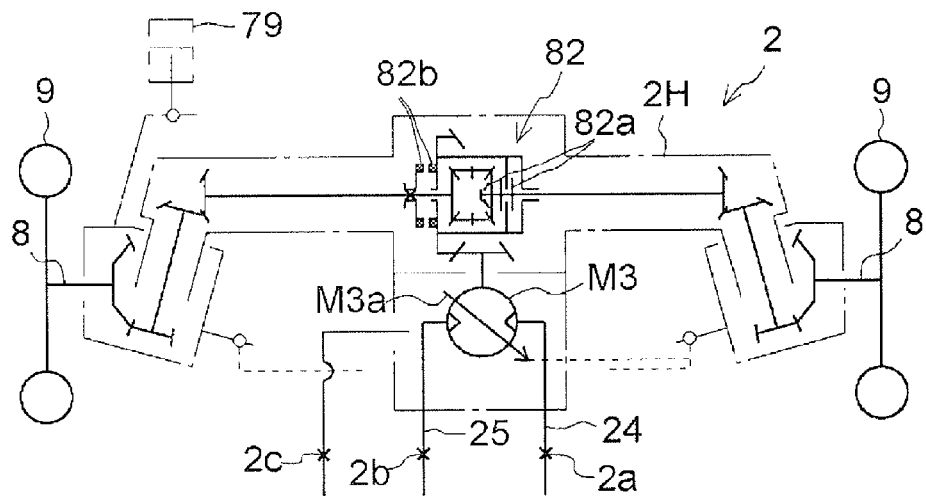
FIG. 5 is a hydraulic circuit diagram of an alternative front transaxle to be adapted to the hydraulic circuit of FIG. 3.

The parallel connected hydraulic motors M2 and M3 may be replaced with a combination of variable displacement hydraulic motor M2 and a differential gear unit 82, as shown in FIG. 5. Differential gear unit 82 is driven by hydraulic motor M2 and differentially connects axles 8 to each other. In front transaxle housing 2H shown in FIG. 5, differential gear unit 82 is provided with a limited slip differential (LSD) element 82a and a differential lock element 82b. Differential lock element 82b is manually operated so as to lock axles 8 to each other, i.e., cancel the differential rotation of axles 8, thereby transmitting torque to front wheel 9 slipping in mud or a ditch. However, even when differential lock element 82b is not operated for differential lock, LSD element 82a transmits a considerable amount of power to the slipping wheel 9. LSD element 82a can be any type element, such as an element including a pair of helical planetary gears, or a viscous coupling type element. Differential gear unit 82 may be provided with either LSD element 82a or differential lock element 82b. Alternatively, differential gear unit 82 may be a normal differential gear unit with neither LSD element 82a nor differential lock element 82b.

Figure 6:
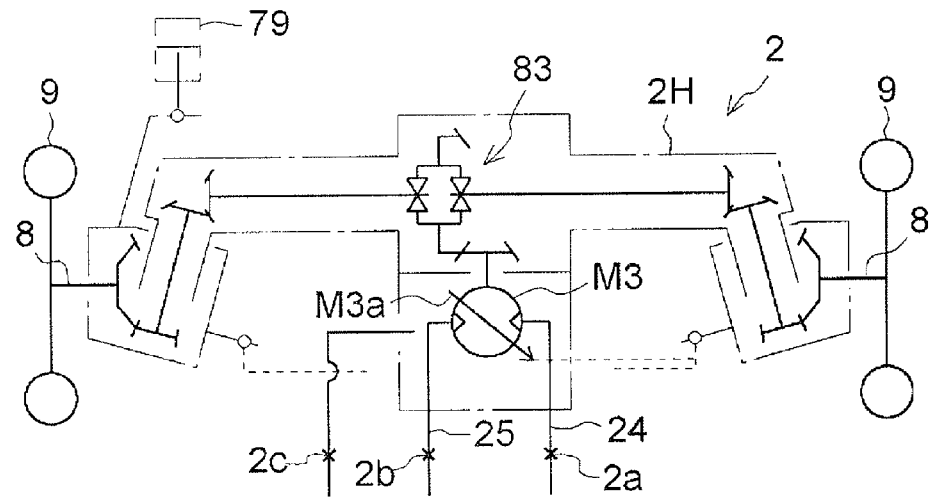
FIG. 6 is a hydraulic circuit diagram of another alternative front transaxle to be adapted to the hydraulic circuit of FIG. 3.
Figure 7:
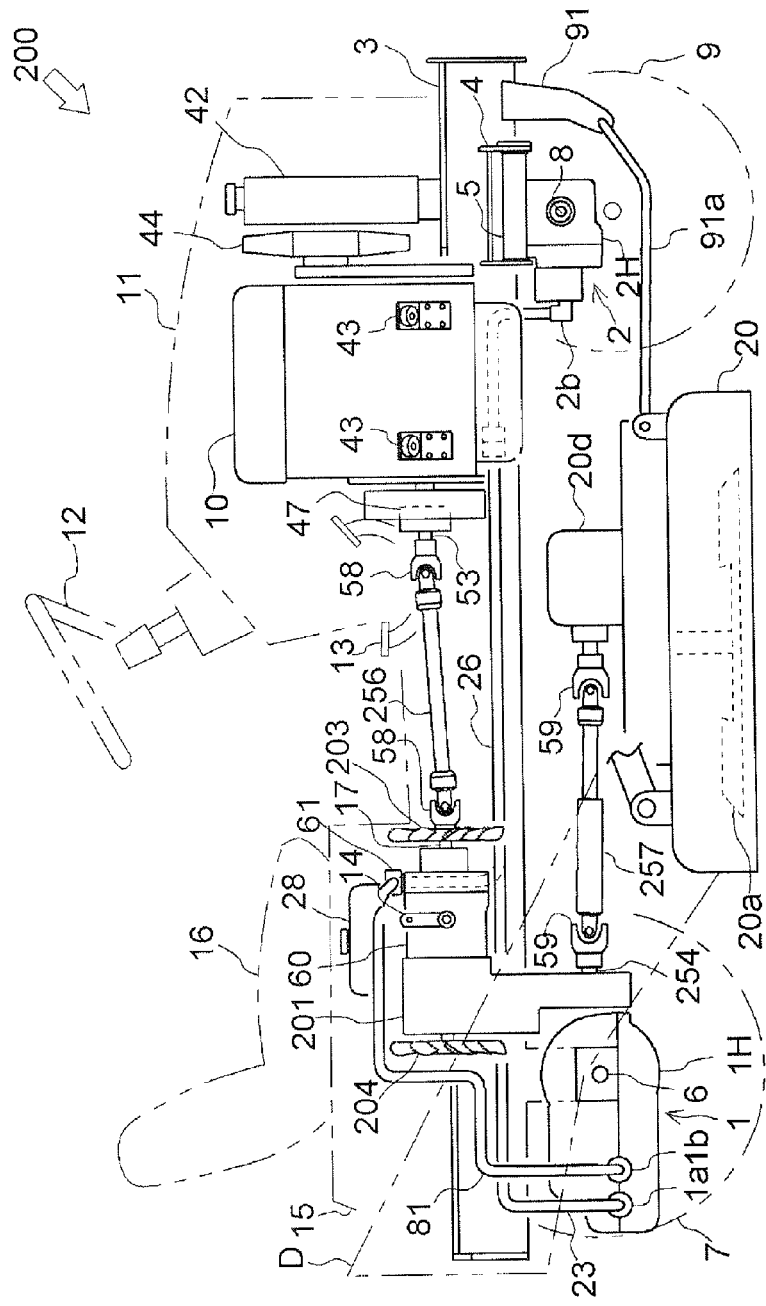
FIG. 7 is a sectional side view of an entire hydraulic four-wheel drive working vehicle equipped with a power transmission system according to a second embodiment of the present invention.
Figure 8:
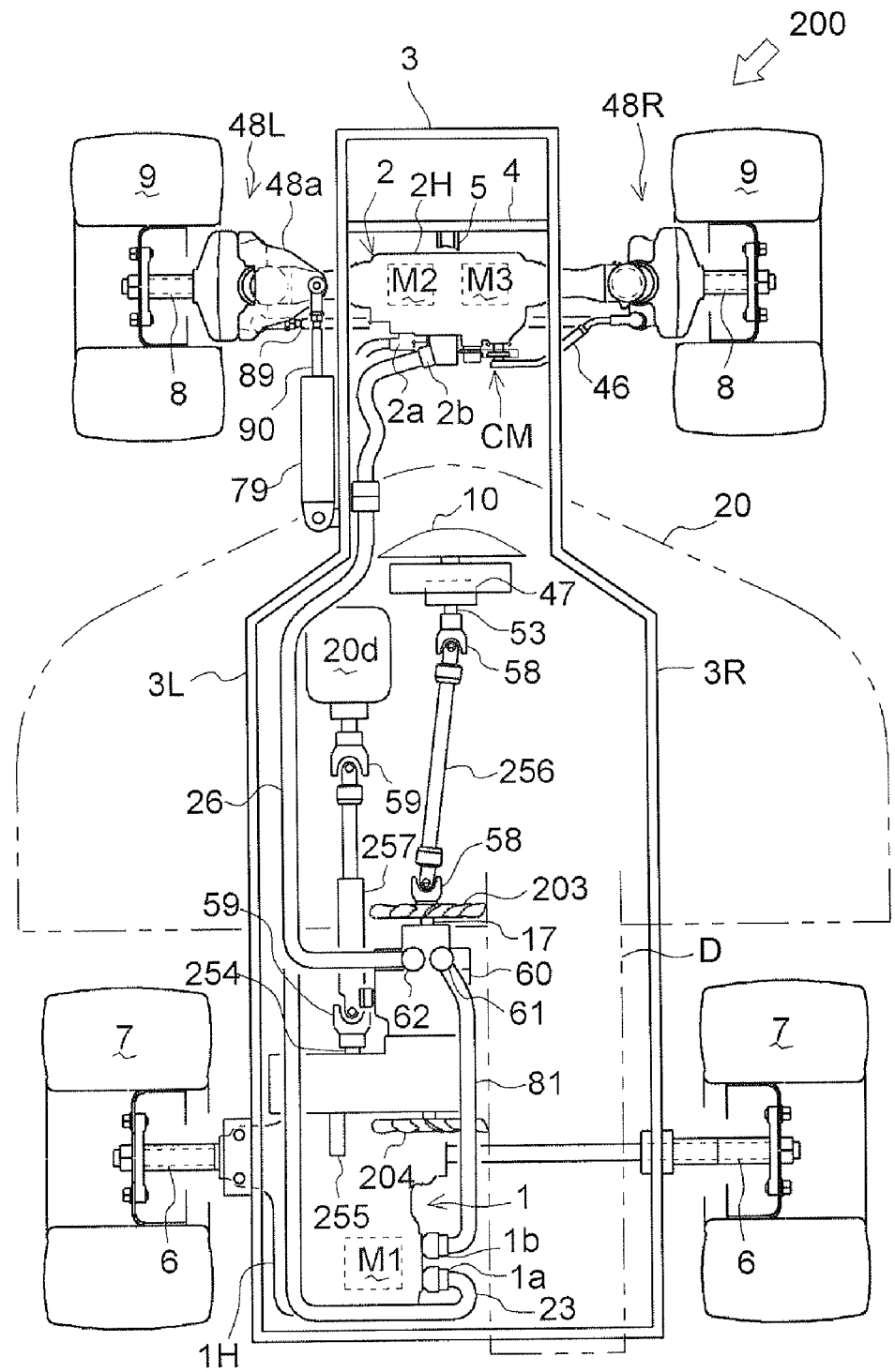
FIG. 8 is a sectional plan view of the entire hydraulic four-wheel drive working vehicle according to the second embodiment.
Figure 9:
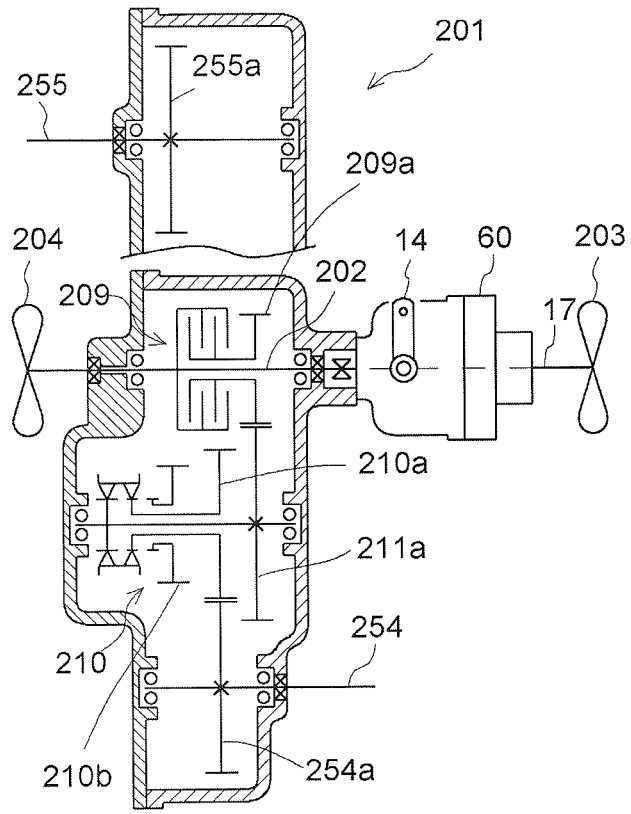
FIG. 9 is a sectional side view of a working power train of the vehicle according to the second embodiment.
Figure 10:
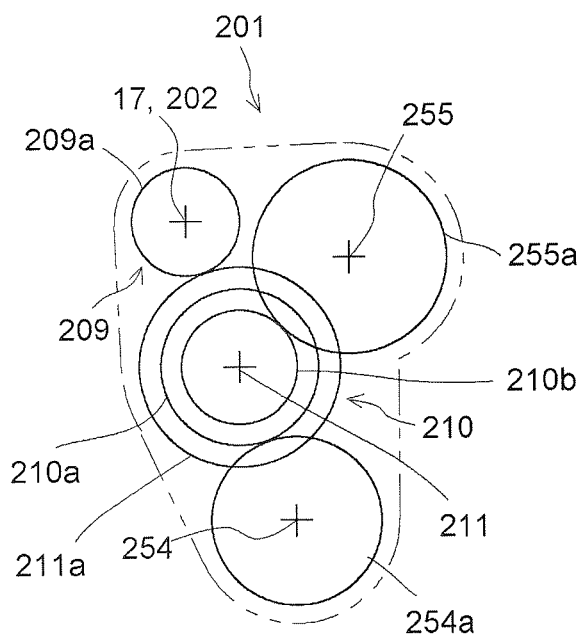
FIG. 10 is a schematic front view of the working power train of the vehicle according to the second embodiment.

Differential gear unit 82 shown in FIG. 5 may be replaced with a bi-directive clutch type differential gear unit 83 as shown in FIG. 6, which is clutched off for establishing the two-wheel drive mode during normal travel of vehicle 100, and is automatically clutched on for establishing the four-wheel drive mode when the travel condition of vehicle 100 becomes abnormal.

Alternatively, in vehicle 100, transaxle 2 supporting steerable wheels 9 may serve as a rear transaxle supporting steerable rear wheels, transaxle 1 supporting unsteerable wheels 7 may serve as a front transaxle supporting unsteerable front wheels, and engine 10 may be disposed between transaxles 1 and 2 so as to have output shaft 53 projecting forward to be drivingly connected to hydraulic pump P in pump housing 60 disposed in front of engine 10.

Alternative vehicle 200 will be described with reference to FIGS. 7 to 10. Parts and components having the same function as those of vehicle 100 are designated by the same reference numerals. A PTO gearbox 201 is fixed onto the left side plate portion 3L of frame 3. Pump housing 60 is fixed onto a front surface of PTO gearbox 201 so as to transmit power to the gear train in PTO gearbox 201. Pump shaft 17 projects forward from pump housing 60. A propeller shaft 256 is interposed between output shaft 53 of engine 10 and pump shaft 17 through respective universal joints 58. Pump shaft 17 projects rearward from pump housing 60 into PTO gearbox 201 so as to serve as an input shaft 202 of the gear train in PTO gearbox 201.

A counter shaft 211, a mid PTO shaft 254 and a rear PTO shaft 255 are rotatably disposed in PTO gearbox 201 in the fore-and-aft direction (in parallel to input shaft 202). Mid PTO shaft 254 is disposed downwardly leftward (in FIG. 10, downwardly rightward) from input shaft 202 and projects forward from PTO gearbox 201. Rear PTO shaft 255 is disposed leftward (in FIG. 10, rightward) from input shaft 202 and projects rearward from PTO gearbox 201.

In PTO gearbox 201, clutches 209 and 210 are drivingly interposed in series between input shaft 202 and PTO shafts 254 and 255. Clutch 209 is selectively clutched on for transmitting power from input shaft 202 to clutch 210, or clutched off for isolating power of input shaft 202 from clutch 210. Clutch 210 is selectively clutched on for transmitting power of counter shaft 110 to rear PTO shaft 255, or clutched off for isolating power of counter shaft 110 from rear PTO shaft 255.

More specifically, in PTO gearbox 201, a gear 211a is fixed on counter shaft 211, and gears 254a and 255a are fixed on respective PTO shafts 254 and 255. A gear 209a is relatively rotatably provided on input shaft 202 and constantly meshes with gear 211a. Clutch 209 is interposed between gear 209a and input shaft 202. Clutch 209 is selectively clutched on for not-relatively rotatably engaging gear 209a to input shaft 202 to thereby drive counter shaft 211, or clutched off for disengage gear 209a from input shaft 202 to thereby shut off rotation of input shaft 202 from counter shaft 211.

A gear 210a is not relatively rotatably provided on counter shaft 211 and constantly meshes with gear 254a. That is, mid PTO shaft 254 is driven by input shaft 202 unless clutch 209 is clutched off and regardless of whether clutch 210 is clutched on or off. A gear 210b is relatively rotatably provided on a boss portion of gear 210a and constantly meshes with gear 255a. Clutch 210 is interposed between counter shaft 211 and gear 210b. Clutch 210 is selectively clutched on for not relatively rotatably engaging gear 210b to counter shaft 211 to thereby drive rear PTO shaft 255, or clutched off for disengaging gear 210b from counter shaft 211 to thereby shut off rotation of counter shaft 211 from rear PTO shaft 255.

A propeller shaft 257 is interposed between mid PTO shaft 254 and the input shaft projecting rearward from gearbox 20d on mower 20 through respective universal joints 59 so as to transmit power of mid PTO shaft 254 to rotary blades 20a.

When duct D with the duct fan is attached onto vehicle 200, the duct fan is drivingly connected to rear PTO shaft 255. Due to clutch 210 in PTO gearbox 201, another clutch does not have to be interposed between rear PTO shaft 255 and a device for driving the duct fan.

A cooling fan 203 is fixed on the forward projecting portion of pump shaft 17 in front of pump housing 60. Cooling fan 203 blows air rearward to pump housing 60 and the front surface of PTO gearbox 201, so as to cool hydraulic pump P in pump housing 60 and the gears and clutches in PTO gearbox 201. Cooling fan 203 also blows air to pipes 26 and 81 disposed adjacent to cooling fan 203, thereby efficiently cooling fluid circulating in HST circuit HC1.

Further, input shaft 202 (the rearward extended portion of pump shaft 17) projects rearward from PTO gearbox 201 so as to be fixedly provided thereon with a cooling fan 204. Cooling fan 204 blows air forward to the rear surface of PTO gearbox 201, so as to effect cooling of PTO gearbox 201 with the assistance of cooling fan 203. The rear surface of PTO gearbox 201 reflects the air blown from cooling fan 204 rearward toward rear transaxle housing 1H, thereby cooling components in rear transaxle housing 1H. Alternatively, cooling fan 204 may blow air rearward toward rear transaxle housing 1H.

Pump housing 60, PTO gearbox 201, rear transaxle housing 1H, mower gearbox 20d, reservoir tank 28 and pipes 23, 26 and 81 are laterally eccentrically collected (leftward) so as to ensure optional arrangement of duct D in a (rightward) space laterally opposite to these power transmission components.

The above-mentioned alternative arrangements adaptable to vehicle 100, such as bi-directive clutch type differential gear unit 135 in rear transaxle 1 and the combination of hydraulic motor M3 and differential gear unit 82 or 83 in front transaxle 2, are also adaptable to vehicle 200.

Figure 11:
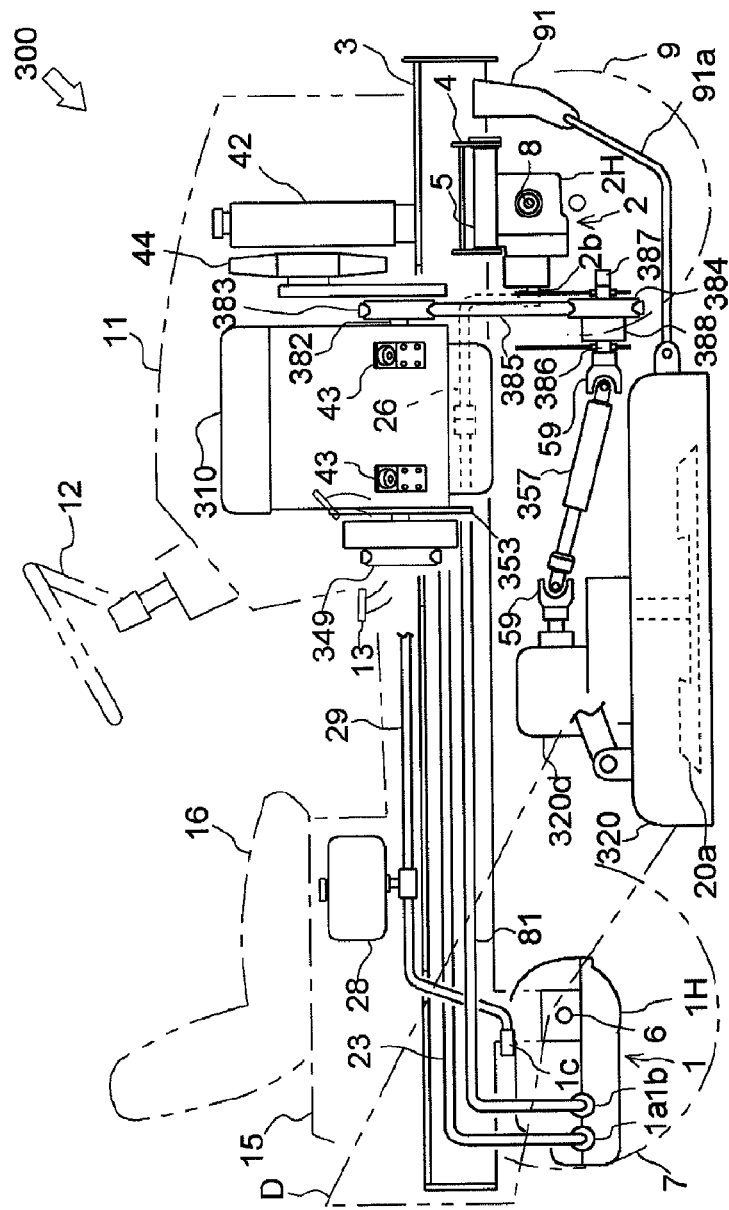
FIG. 11 is a sectional side view of an entire hydraulic four-wheel drive working vehicle equipped with a power transmission system according to a third embodiment of the present invention.
Figure 12:
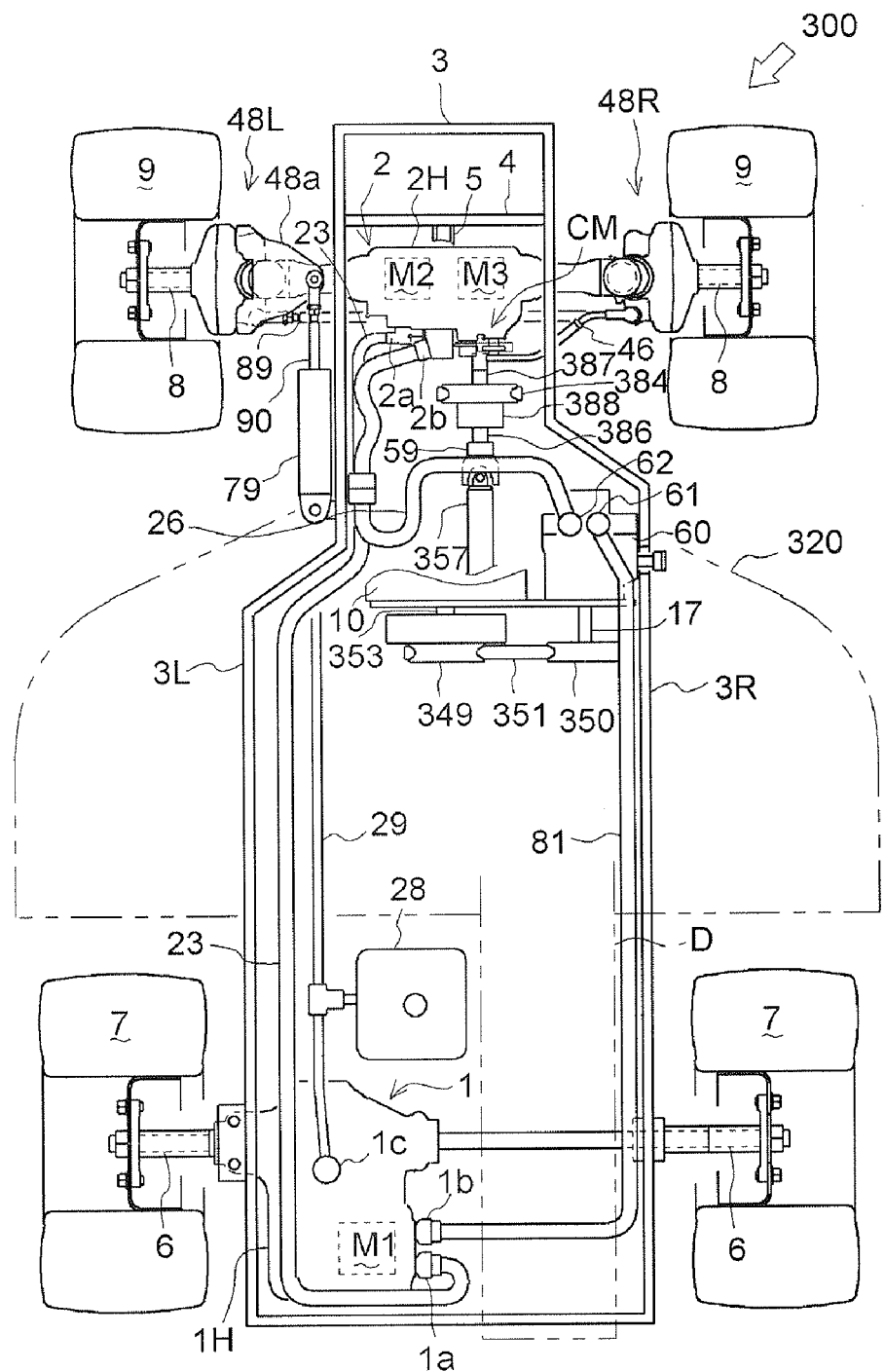
FIG. 12 is a sectional plan view of the entire hydraulic four-wheel drive working vehicle according to the third embodiment.

Alternative vehicle 300 will be described with reference to FIGS. 11 and 12. Parts and components having the same function as those of vehicle 100 are designated by the same reference numerals. An engine 310 is mounted on the front portion of frame 3, similar to engine 10 of vehicle 100 or 200. Engine 310 includes a horizontal rear output shaft 353 projecting rearward from the rear end surface of engine 310 at a lateral middle portion between the left and right side plate portions 3L and 3R of frame 3. Engine 310 also includes a horizontal front output shaft 382 projecting forward from the front end surface of engine 310. The rotation direction of output shafts 353 and 382 is the same as that of output shaft 53 of engine 10.

A vertical support plate 311 is fixed onto the rear end surface of engine 310 and extended rightward from the portion fixed to engine 310. Pump housing 60 is fixed onto a front surface of the rightward extended portion of support plate 311 so as to be disposed on the right side of engine 310 and along the right side plate portion 3R of frame 3.

Pump shaft 17 projects rearward (in the fore-and-aft direction) from pump housing 60 through support plate 311 so as to be laterally aligned with output shaft 353 of engine 310 in parallel. A pulley 349 is fixed on rear engine output shaft 353, and a pulley 350 is fixed on the rearward projecting portion of pump shaft 17. A belt 351 is interposed between pulleys 349 and 350, so as to transmit power from engine 310 to hydraulic pump P in pump housing 60. Radiator fan 44 in front of engine 310 may be used for cooling pump housing 60.

Rear transaxle 1 and front transaxle 2 in vehicle 300 are configured and disposed similar to those of vehicle 100 or 200, so that the rotational direction of axles 6 relative to the fluid suction and delivery direction of hydraulic motor M1 and the rotational direction of axles 8 relative to the fluid suction and delivery direction of hydraulic motors M2 and M3 in vehicle 300 are the same as those of vehicle 100 or 200. Namely, during forward travel of vehicle 300, ports 1a and 2b serve as delivery ports, and ports 1b and 2a serve as suction ports.

The rotational direction of swash plate Pa and speed control lever 14 relative to the depression of speed control pedal 13 in vehicle 300 is reversed so as to be opposite to that of vehicle 100 or 200, in consideration that the rotation direction of pump shaft 17 in vehicle 300 is opposite to that in vehicle 100 or 200 because pump housing 60 is reversed in the fore-and-aft direction. Consequently, during forward travel of vehicle 300, port 61 serves as the delivery port, and port 62 serves as the suction port, similar to those in vehicles 100 or 200. Thus, vehicle 300 employs HST circuit HC1 with the same fluid circulation route such that hydraulic pump P supplies fluid to hydraulic motor M1 in rear transaxle 1 prior to hydraulic motors M2 and M3 in front transaxle 2 during forward travel of vehicle 300.

In this regard, pipe 81 interposed between ports 61 and 1b is extended along the right side plate portion 3R of frame 3 (rightward from duct D), pipe 23 interposed between ports 1a and 2a is extended along the left side plate portion 3L of frame 3 (leftward from duct D), and pipe 26 interposed between ports 62 and 2b is extended substantially laterally so as to pass through a space between the bottom end of engine 310 and a later-discussed propeller shaft 357 below engine 310, thereby constituting HST circuit HC1.

A mid PTO shaft 386 projects rearward from pulley 385 through an electromagnetic clutch 388, and a front PTO shaft 387 projects forward from pulley 385. A mower 320 is suspended and disposed similar to mower 20, however, mower 320 is provided on the top thereof with a mower gearbox 320d from which an input shaft projects forward toward mid PTO shaft 386 in front of gearbox 320d. Propeller shaft 357 is interposed between mid PTO shaft 386 and the forward projecting input shaft of mower gearbox 320d through respective universal joints 59.

Electromagnetic clutch 388 may be replaced with a tension clutch interposed between pulleys 383 and 384. One of PTO shafts 386 and 387 may be removed. The belt-and-pulley type working power train may be replaced with a gear train interposed between output shaft 382 and PTO shafts 386 and 387. Alternatively, a working power train for driving rotary blades in mower 320 may be configured so as to transmit power from pump shaft 17. In this case, an electromagnetic clutch may be provided onto pulley 350, or a belt tension clutch may be disposed so as to control the tension of belt 351.

While rear transaxle housing 1H and reservoir tank 28 are disposed laterally opposite to duct D disposed rightward in the inside of frame 3, pump housing 60 and the working power train are disposed forward from duct D, so as to expand a free space leftward of duct D.

The above-mentioned alternative arrangements adaptable to vehicle 100, such as bi-directive clutch type differential gear unit 135 in rear transaxle 1 and the combination of hydraulic motor M3 and differential gear unit 82 or 83 in front transaxle 2, are also adaptable to vehicle 300.

Figure 13:
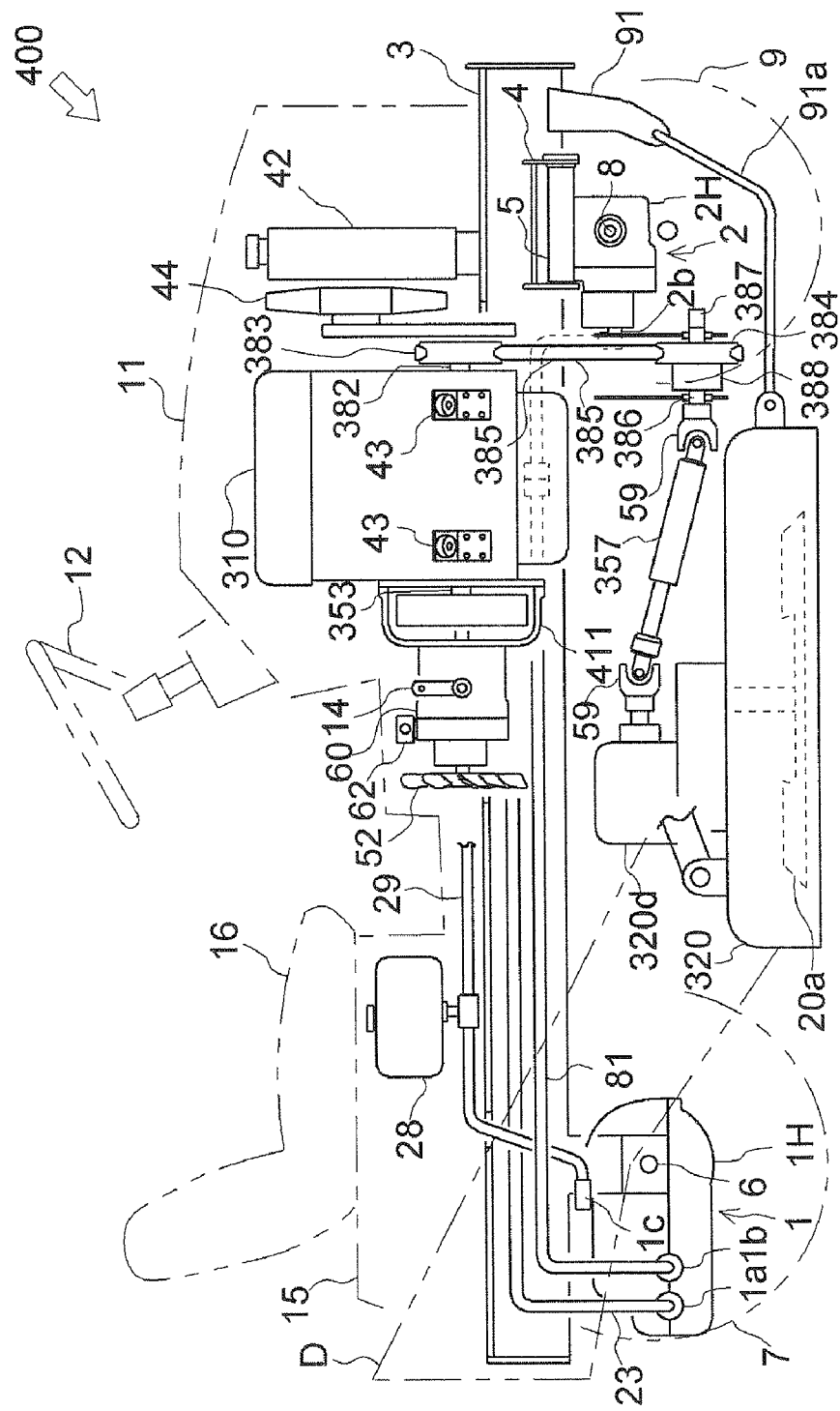
FIG. 13 is a sectional side view of an entire hydraulic four-wheel drive working vehicle equipped with a power transmission system according to a fourth embodiment of the present invention.
Figure 14:
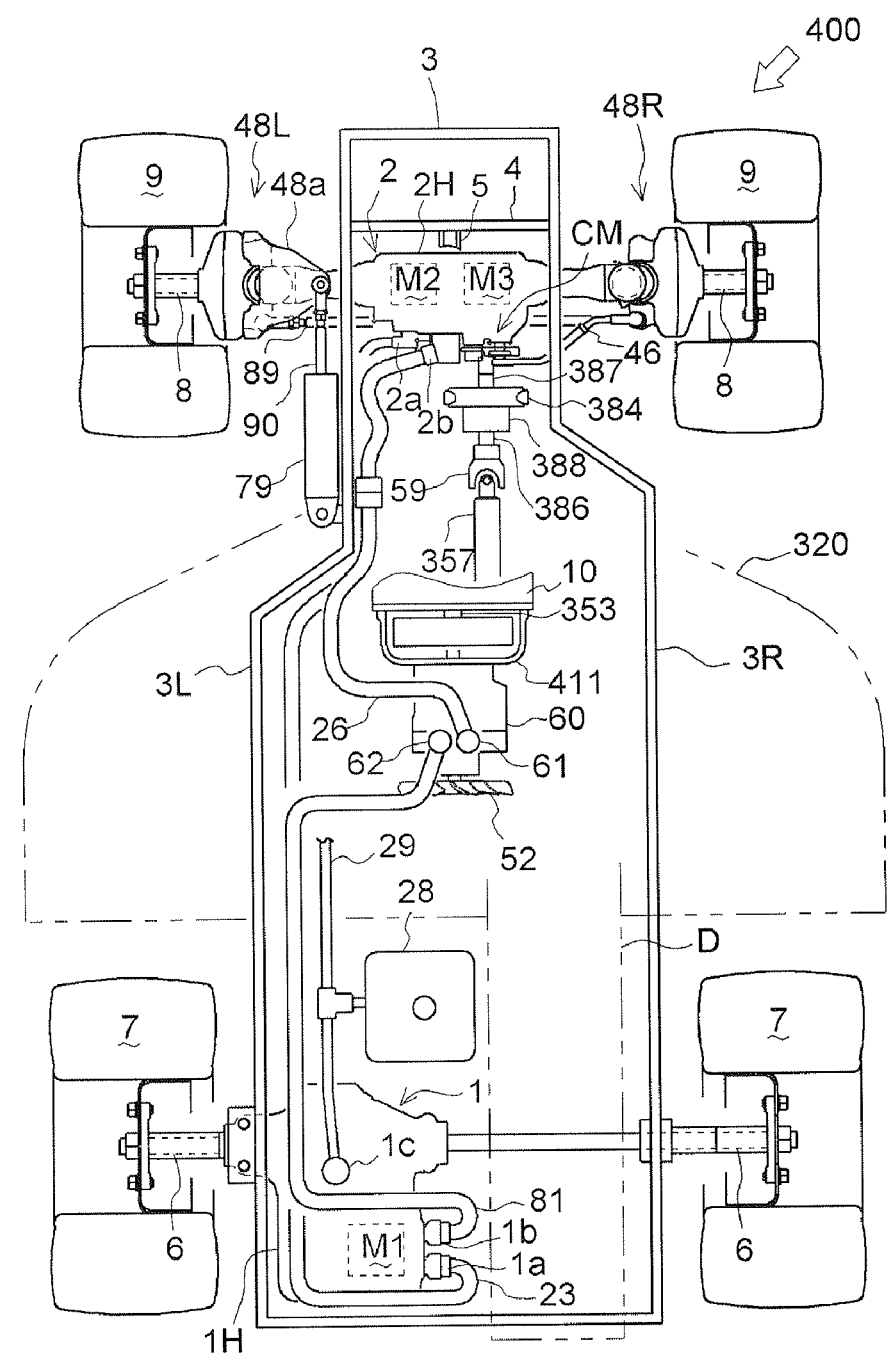
FIG. 14 is a sectional plan view of the entire hydraulic four-wheel drive working vehicle according to the fourth embodiment.

Alternative vehicle 400 will be described with reference to FIGS. 13 and 14. Parts and components having the same function as those of vehicles 100 and 300 are designated by the same reference numerals.

Arrangements of engine 310 having opposite output shafts 353 and 382, mid and front PTO shafts 386 and 387, and the working power train interposed between front engine output shaft 382 and PTO shafts 386 and 387 are the same as those of vehicle 300.

In vehicle 400, a support member 411 is attached onto the rear surface of engine 310 so as to support pump housing 60. Pump shaft 17 projects forward from pump housing 60 so as to be directly connected to rear engine output shaft 353. Therefore, the rotational direction of pump shaft 17, the fluid suction and delivery direction of hydraulic pump P and the tilt direction of movable swash plate Pa relative to the depression direction of speed control pedal 13 is the same as that of vehicle 100 and 200. Thus, vehicle 400 employs HST circuit HC1 and the piping including pipes 23, 26 and 81, as shown in FIG. 3.

In this regard, on the assumption that the arrangement and configuration of front and rear transaxles 1 and 2 are similar to those in vehicles 100, 200 and 300, pipe 26 interposed between ports 61 and 2b, pipe 81 interposed between ports 62 and 1b, and pipe 23 interposed between ports 1a and 2a are collected leftward from engine 310 and along the left side plate portion 3L of frame 3 so as to be prevented from interfering with engine 310 and the working power train for driving the rotary blades in mower 320, and ensure a rightward space in the inside of frame 3 for arrangement of duct D.

Pump shaft 17 further projects rearward from pump housing 60 so as to be fixedly provided thereon with cooling fan 52 for cooling pump housing 60.

The above-mentioned alternative arrangements adaptable to vehicles 100 and 300, such as bi-directive clutch type differential gear unit 135 in rear transaxle 1, the combination of hydraulic motor M3 and differential gear unit 82 or 83 in front transaxle 2, and the gear train between engine output shaft 382 and PTO shafts 386 and 387, are also adaptable to vehicle 400.

It is further understood by those skilled in the art that the foregoing description is a preferred embodiment of the disclosed apparatus and that various changes and modifications may be made in the invention without departing from the spirit and scope thereof defined by the following claims.

What is claimed is:

1. A vehicle power transmission system comprising:
    a prime mover supported by a vehicle frame, the prime mover including a prime mover output shaft projecting in the fore-and-aft horizontal direction of the vehicle;
    a pump housing;
    a hydraulic pump disposed in the pump housing, the hydraulic pump including a pump shaft projecting from the pump housing in the fore-and-aft horizontal direction of the vehicle so as to be drivingly connected to the prime mover output shaft;
    a hydraulic motor disposed outside of the pump housing so as to be fluidly connected to the hydraulic pump;
    a transaxle supported by one of front and rear portions of the vehicle frame, the transaxle including a transaxle housing, a pair of axles disposed in the transaxle housing so as to be driven by the hydraulic motor, and a differential gear unit disposed in the transaxle housing so as to be drivingly interposed between the hydraulic motor and the pair of axles;
    a power take off shaft (a PTO shaft) extended in the fore-and-aft horizontal direction of the vehicle;
    a working unit having an input shaft extended in the fore-and-aft horizontal direction of the vehicle;
    a propeller shaft interposed between the PTO shaft and the input shaft of the working unit; and
    a drive train extracting a part of power transmitted from the prime mover output shaft to the pump shaft so as to transmit the extracted power to the PTO shaft.

2. The vehicle power transmission system according to claim 1, wherein a gear train serving as the drive train includes a drive shaft, which is extended in the fore-and-aft horizontal direction of the vehicle so as to be driven by the pump shaft, and gears, which are interposed between the drive shaft and the PTO shaft so as to transmit power from the drive shaft to the PTO shaft.

3. The vehicle power transmission system according to claim 2, further comprising:
    a propeller shaft interposed between the prime mover output shaft and the pump shaft.

4. The vehicle power transmission system according to claim 2, further comprising:
    a cooling fan provided on the pump shaft.

5. The vehicle power transmission system according to claim 2, wherein the drive shaft is extended coaxially to the pump shaft and is connected to the pump shaft so as to be rotatably integral with the pump shaft.

6. The vehicle power transmission system according to claim 2, further comprising:
    a gear housing incorporating the gear train and supporting the PTO shaft, wherein the pump housing is fixed to the gear housing so as to drivingly connect the pump shaft to the drive shaft.

7. The vehicle power transmission system according to claim 2, wherein the PTO shaft serves as a first PTO shaft, and wherein the vehicle power transmission system further comprises:
    a second power take off shaft (a second PTO shaft), wherein the gear train further includes a gear for transmitting power from the drive shaft to the second PTO shaft.

8. The vehicle power transmission system according to claim 7, further comprising:
    a cooling fan provided on the second PTO shaft.

9. The vehicle power transmission system according to claim 7, further comprising:
    a gear housing incorporating the gear train and supporting the first and second PTO shafts, wherein the pump housing is fixed to the gear housing so as to drivingly connect the pump shaft to the drive shaft.

10. The vehicle power transmission system according to claim 9, wherein the first and second PTO shafts projects outward from the gear housing opposite to each other.

11. The vehicle power transmission system according to claim 2, wherein the hydraulic motor serves as a first hydraulic motor, the transaxle serves as a first transaxle, and the pair of axles serve as first axles, and wherein the vehicle power transmission system further comprises:
    a second transaxle supported by the other rear or front portion of the vehicle frame, the second transaxle including a second transaxle housing, a pair of second axles, which are disposed in the second transaxle housing, and a pair of second hydraulic motors, which are disposed in the second transaxle housing so as to be fluidly connected to the hydraulic pump and to drive the respective second axles.

12. The vehicle power transmission system according to claim 2, wherein the hydraulic motor serves as a first hydraulic motor, the transaxle serves as a first transaxle, the pair of axles serve as first axles, and the differential gear unit serves as a first differential gear unit, and wherein the vehicle power transmission system further comprises:
    a second transaxle supported by the other rear or front portion of the vehicle frame, the second transaxle including a second transaxle housing, a pair of second axles, which are disposed in the second transaxle housing, a second hydraulic motor, which is disposed in the second transaxle housing so as to be fluidly connected to the hydraulic pump, and a second differential gear unit, which is disposed in the second transaxle housing so as to be drivingly interposed between the second hydraulic motor and the pair of second axles.

13. The vehicle power transmission system according to claim 1, wherein the prime mover output shaft serves as a first prime mover output shaft, wherein the prime mover further includes a second prime mover output shaft, which projects opposite to the first prime mover output shaft so as to be rotatably integral with the first prime mover output shaft, and wherein a belt drive train serving as the drive train includes a belt interposed between the second prime mover output shaft and the PTO shaft.

14. The vehicle power transmission system according to claim 13, wherein the pump housing is fixed to the prime mover, and wherein the pump shaft is extended coaxially to the first prime mover output shaft and is connected to the first prime mover output shaft so as to be rotatably integral with the first prime mover output shaft.

15. The vehicle power transmission system according to claim 14, further comprising:
   a cooling fan provided on the pump shaft.

16. The vehicle power transmission system according to claim 13, wherein the pump shaft is extended parallel to the first prime mover output shaft, and wherein the vehicle power transmission system further comprises:
   another drive train interposed between the first prime mover output shaft and the pump shaft.

17. The vehicle power transmission system according to claim 16, wherein a belt drive train serving as said other drive train includes a belt interposed between the first prime mover output shaft and the pump shaft.

18. The vehicle power transmission system according to claim 13, wherein the hydraulic motor serves as a first hydraulic motor, the transaxle serves as a first transaxle, and the pair of axles serve as first axles, and wherein the vehicle power transmission system further comprises:
   a second transaxle supported by the other rear or front portion of the vehicle frame, the second transaxle including a second transaxle housing, a pair of second axles, which are disposed in the second transaxle housing, and a pair of second hydraulic motors, which are disposed in the second transaxle housing so as to be fluidly connected to the hydraulic pump and to drive the respective second axles.

19. The vehicle power transmission system according to claim 13, wherein the hydraulic motor serves as a first hydraulic motor, the transaxle serves as a first transaxle, the pair of axles serve as first axles, and the differential gear unit serves as a first differential gear unit, and wherein the vehicle power transmission system further comprises:
   a second transaxle supported by the other rear or front portion of the vehicle frame, the second transaxle including a second transaxle housing, a pair of second axles, which are disposed in the second transaxle housing, a second hydraulic motor, which is disposed in the second transaxle housing so as to be fluidly connected to the hydraulic pump, and a second differential gear unit, which is disposed in the second transaxle housing so as to be drivingly interposed between the second hydraulic motor and the pair of second axles.

* * * * *